United States Patent Office 2,973,387
Patented Feb. 28, 1961

2,973,387

PRODUCTION OF ERYTHROSE AND GLYOXAL FROM DIALDEHYDE STARCH

John W. Van Cleve and Charles L. Mehltretter, Peoria, Ill., assignors to the United States of America as represented by the Secretary of Agriculture No Drawing. Filed Dec. 8, 1958, Ser. No. 779,034

2 Claims. (Cl. 260—601)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

In U.S. Patent 2,796,447, dialdehyde starch was hydrogenolyzed in an aqueous system to yield erythritol and ethylene glycol, polyols having considerable industrial value. If the dialdehyde starch could be hydrolyzed first to produce erythrose and glyoxal in high yields and the two products were feasibly separated they would have considerable utility in the chemical industry. The glyoxal is of value as a cross-linking agent for cotton and proteins and as an intermediate in the synthesis of drugs and commands a higher price than ethylene glycol. Isolation of the glyoxal would also eliminate the use of the 2 moles of hydrogen required to convert one mole of glyoxal to ethylene glycol. The erythrose could then be hydrogenated separately to erythritol, a product having industrial applications as indicated in U.S. Patent 2,796,447.

Previous attempts to hydrolyze dialdehyde starch or periodate oxidized starch using aqueous hydrochloric acid (J. Am. Chem. Soc. 60, 989 (1938)) have given yields of glyoxal of about 20 percent of theory and those of erythrose of about 15 percent. Furthermore separation of those products was obtained by commercially impractical methods.

Caldwell and Hixon (J. Biol. Chem. 123, 595 (1938)) could identify glyoxal in the dialdehyde starch hydrolysate but not erythrose. Jayme and Maris (Ber. 77, 385 (1944)) hydrolyzed periodate oxidized cellulose with aqueous hydrochloric acid or sulfuric acid for 17 hours at about 100° C. and obtained yields of about 53 percent of glyoxal phenylosazone. The higher yield was claimed to be due to better periodate oxidation of cellulose in a buffered system prior to hydrolysis.

Unexpectedly, we have found that when dialdehyde starch is hydrolyzed with sulfurous acid under superatmospheric pressure under conditions of concentration of dialdehyde starch of less than 10 percent, with temperatures of hydrolysis between 90 and 115° for 1 to 9 hours, greatly improved yields of both glyoxal and of erythrose are obtained. The glyoxal is readily isolated quantitatively from the hydrolysate by precipitation of its hydrated sodium bisulfite complex with 40 percent methanol as described in "Organic Syntheses, Collective Volume III," John Wiley and Son, 1955, page 438, leaving in solution all of the erythrose that was formed. Although we do not know the exact reason for this unusual result, we believe it is related to the protection of the free aldehyde groups of the dialdehyde starch and of the liberated glyoxal and erythrose by complexing with bisulfite ions in solution to prevent appreciable reaction of the active aldehyde groups with the hydroxyl groups in dialdehyde starch and in the erythrose which is liberated during the hydrolysis. The sulfurous acid apparently is not only an acid catalyst for the hydrolysis but also acts as a protectant to prevent reaction of the aldehyde groups present and formed under the specific conditions of the hydrolysis.

The fact that high yields of glyoxal and erythrose can now be obtained by simple hydrolysis with cheap sulfurous acid will allow those products to be obtained at much lower cost and will expedite their commercial utility.

The following specific examples illustrate the invention.

Example 1

A mixture of 5.0 grams of dialdehyde starch in 240 ml. of distilled water was placed in a high pressure reaction bomb. The air in the bomb was displaced with sulfur dioxide and the bomb heated at 115° C. for 1 hour. The initial pressure in the bomb before heating was 70 p.s.i. and during heating to 115° C. became 230 p.s.i. The bomb was then cooled, the pressure released and the hydrolysate analyzed for glyoxal. This was done by adding 24 gms. of sodium bisulfite to the solution and adding 450 ml. of methanol to quantitatively precipitate glyoxal sodium bisulfite hydrate. The yield of complex salt was 5.98 g. and indicates that a yield of glyoxal of 77 percent of theory had been obtained.

Example 2

22.9 g. of dialdehyde starch was slurried in 380 ml. of water and placed in a bomb reactor. Approximately 185 g. of sulfur dioxide was introduced to the bomb and the hydrolysis carried out at 100° C. for 1½ hours. The maximum pressure in the bomb was 280 p.s.i. during the reaction. Analysis of the hydrolysate indicated the presence of 80 percent of glyoxal and 70 percent of erythrose.

Example 3

Same as Example 1, but bomb heated at 100° C. for 3 hours. The yield of glyoxal was 84 percent of theory. The erythrose present in the filtrate of the glyoxal sodium bisulfite complex was determined as 79 percent of theory by periodate oxidation to formaldehyde which was estimated colorimetrically by the standard method using chromotropic acid reagent. It was also isolated by paper chromatography.

We claim:

1. The method of producing a mixture consisting essentially of erythrose and glyoxal in high yields which comprises subjecting an aqueous reaction mixture comprising dialdehyde starch to hydrolysis under superatmospheric pressure at an elevated temperature in the presence of sulfurous acid for a period of from 1 to 9 hours.

2. A method of producing a hydrolysate mixture comprising essentially erythrose and glyoxal, said method comprising the steps of subjecting a 1–10 percent aqueous concentration of dialdehyde starch to hydrolysis for between 1–9 hours at a temperature of 90–115° C. with sulfurous acid, the concentration of said sulfurous acid being sufficient to give a sulfur dioxide pressure of 250–370 p.s.i. at the said temperatures.

References Cited in the file of this patent

Jackson et al.: "Jour. Amer. Chem. Soc.," volume 59 (1937), pp. 2049–2050.

Jackson et al.: "Jour. Amer. Chem. Soc.," volume 60 (1938), pp. 989–991.

Jayme et al.: "Ber. Deut. Chem.," volume 77 (1944), pp. 383–392.

Jayme et al.: "Chem. Abs.," volume 40 (1945), pages 5242–5243.